(12) United States Patent  
Collins

(10) Patent No.: US 6,601,921 B1  
(45) Date of Patent: Aug. 5, 2003

(54) SEATBACK LATCH RELEASE MECHANISM WITH SAFETY CAPTURE

(75) Inventor: Cecil A. Collins, Sterling Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/941,534

(22) Filed: Aug. 29, 2001

(51) Int. Cl.[7] ................................................ B60N 2/02
(52) U.S. Cl. ........................ 297/378.12; 297/361.1; 297/378.1; 297/367; 297/374; 297/376
(58) Field of Search ......................... 297/361.1, 374, 297/376, 378.12, 378.1, 367

(56) References Cited

U.S. PATENT DOCUMENTS

| | | | |
|---|---|---|---|
| 4,357,050 A | | 11/1982 | Fisher, III |
| 4,634,182 A | * | 1/1987 | Tanaka ........................ 297/363 |
| 4,765,681 A | * | 8/1988 | Houghtaling et al. ........ 297/367 |
| 5,460,429 A | * | 10/1995 | Whalen ................. 297/378.11 |
| 5,547,254 A | * | 8/1996 | Hoshihara ................... 297/367 |
| 5,664,838 A | * | 9/1997 | Baloche ...................... 297/340 |
| 5,718,481 A | | 2/1998 | Robinson |
| 6,106,067 A | * | 8/2000 | Zhuang et al. ........... 297/361.1 |
| 6,161,899 A | | 12/2000 | Yu |

* cited by examiner

Primary Examiner—Peter M. Cuomo  
Assistant Examiner—Sarah C. Burnham  
(74) Attorney, Agent, or Firm—Harness, Dickey & Pierce, P.L.C.

(57) ABSTRACT

A seatback latch release mechanism includes a latch plate fixed for rotation with a rotatable member, a first pin extending from the latch plate, a cam plate pivotally supported by a support plate and including a cam edge in selective sliding contact with the first pin and a second pin extending from the cam plate and in selective sliding contact with an edge of the latch plate. The cam plate is rotatable through a first range in which the first pin slidably engages the cam edge to provide a first torque for rotating the latch plate and the member from a first position. Further rotation of the cam plate transitions to a second range in which the first pin disengages the cam edge and the second pin slidably engages the edge of the latch plate to provide a second torque for rotating the latch plate and the member to a second position.

18 Claims, 9 Drawing Sheets

SEATBACK LATCH RELEASE MECHANISM WITH SAFETY CAPTURE

FIELD OF THE INVENTION

The present invention relates to seat hinge assemblies and more particularly to an improved latch release mechanism for a seat hinge assembly.

BACKGROUND AND SUMMARY OF THE INVENTION

Various latch release mechanisms are known in the art for implementation with vehicle seats. Generally, latch release mechanisms enable selective positioning of a seatback relative to a seat for reclining, seat storage and the like. Traditional latch release mechanisms include a remote handle operatively interconnected with a locking assembly. The locking assembly interfaces with an arm supporting the seatback to lock the seatback in a plurality of positions relative to the seat.

Latch release mechanisms must be designed and constructed to reduce the likelihood of injury or damage during emergency or accident situations. An occurrence of particular concern is reverse-operation of the latch release mechanism in the event that a sufficient force is applied to the seatback when in an upright position. In order to prevent such an occurrence, a mechanism to prohibit rotation of the seatback other than when permitted by actuation of the remote handle is desirable.

Accordingly, a release mechanism is provided for use in conjunction with a member rotatable between first and second positions and supported by a support plate. The release mechanism comprises a latch plate fixed for rotation with the member, a first pin extending from the latch plate, a cam plate pivotally supported by the support plate and including a cam edge in selective sliding contact with the first pin and a second pin extending from the cam plate and in selective sliding contact with an edge of the latch plate. The cam plate is rotatable through a first range whereby the first pin slidably engages the cam edge for providing a first torque for rotating the latch plate and the member from said the first position. The rotation of the cam plate transitions to a second range whereby the first pin disengages the cam edge and the second pin slidably engages the edge of the latch plate for providing a second torque for rotating the latch plate and the member to the second position.

The release mechanism is preferably implemented as a seatback latch release mechanism comprising a support, an arm pivotally supported by the support, a locking arrangement supported by the support for selectively blocking the arm in first and second positions, a member operable between first and second positions of rotation for selectively actuating the locking arrangement and the latch release mechanism. The latch release mechanism includes a latch plate fixed for rotation with the member, a first pin extending from the latch plate, a cam plate pivotally supported by the support plate and including a cam edge in selective sliding contact with the first pin and a second pin extending from the cam plate and in selective sliding contact with an edge of the latch plate. The cam plate is rotatable through a first range whereby the first pin slidably engages the cam edge for providing a first torque for rotating the latch plate and the member from the first position, thereby partially actuating the locking mechanism. Further rotation of the cam plate transitions to a second range whereby the first pin disengages the cam edge and the second pin slidably engages the edge of the latch plate for providing a second torque for rotating the latch plate and the member to the second position, thereby enabling full actuation of the locking mechanism.

The present invention further provides a seat recess formed in the cam plate for retaining the first pin when the member is in the first position, whereby rotation of the member, absent concurrent rotation of the cam plate, is prohibited.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
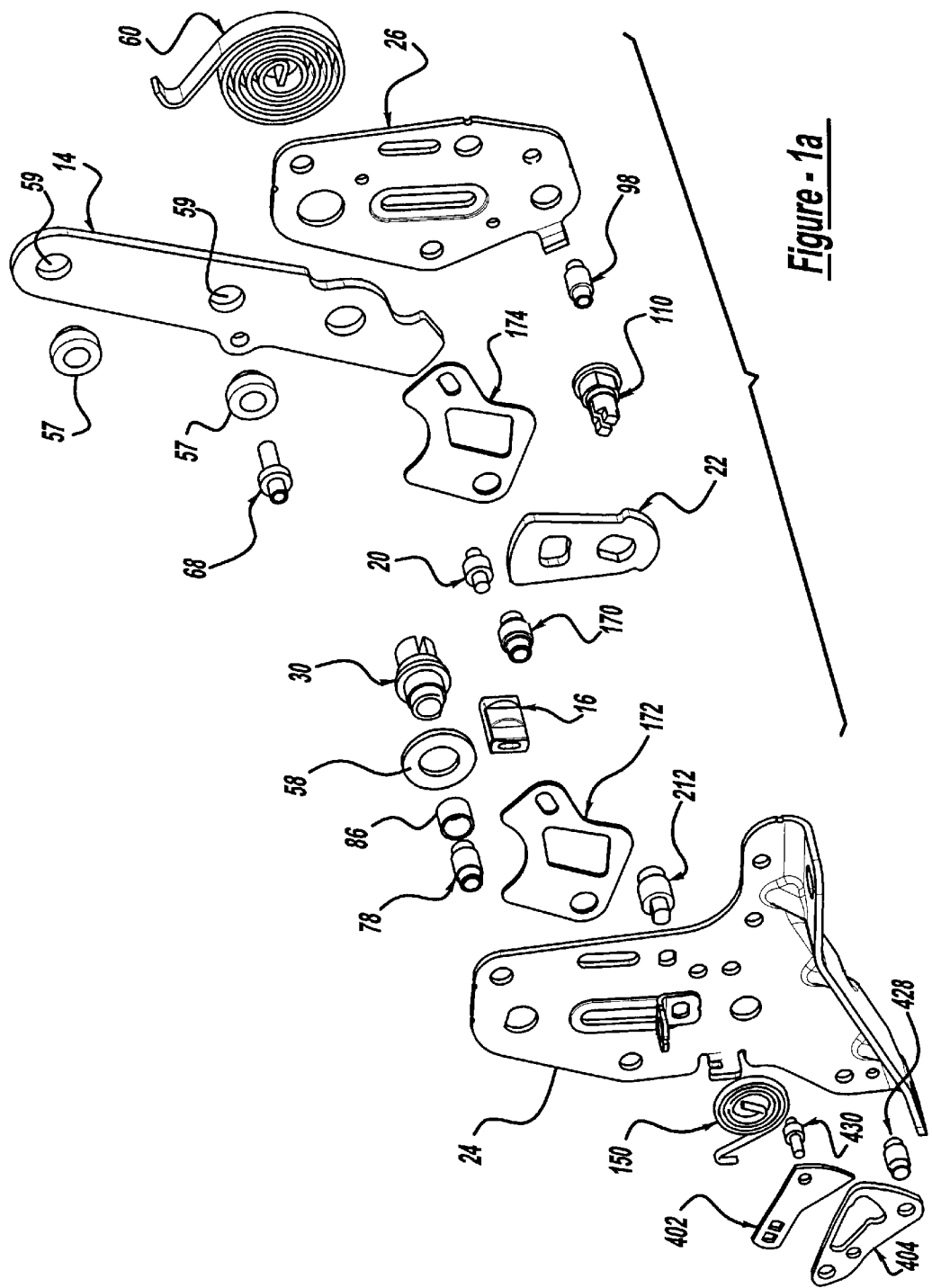
FIG. 1A is an exploded perspective view of a seat hinge assembly according to the principles of the present invention.
Figure 1B:
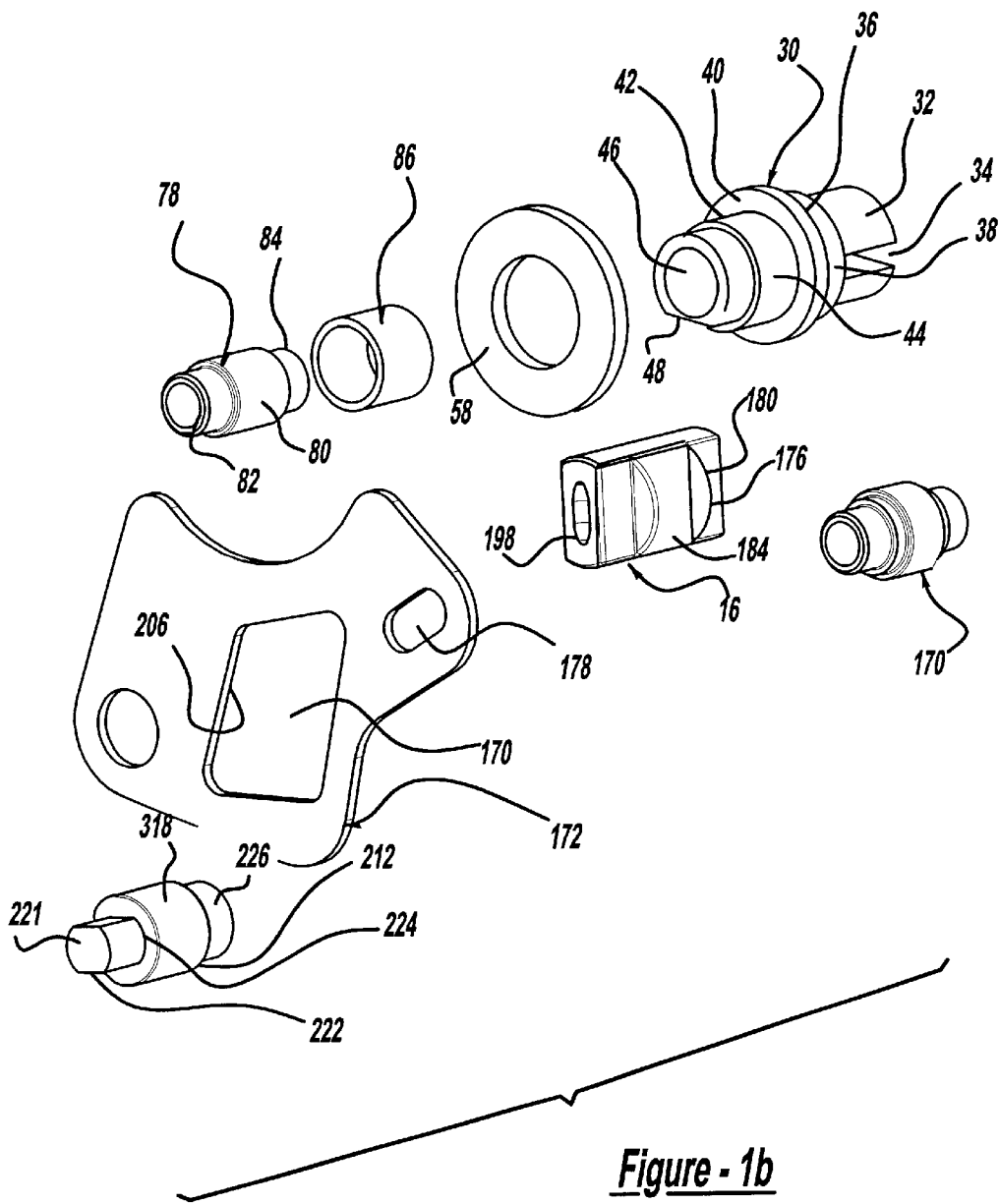
FIG. 1B is a detailed view of latch components of the seat hinge assembly.
Figure 1C:
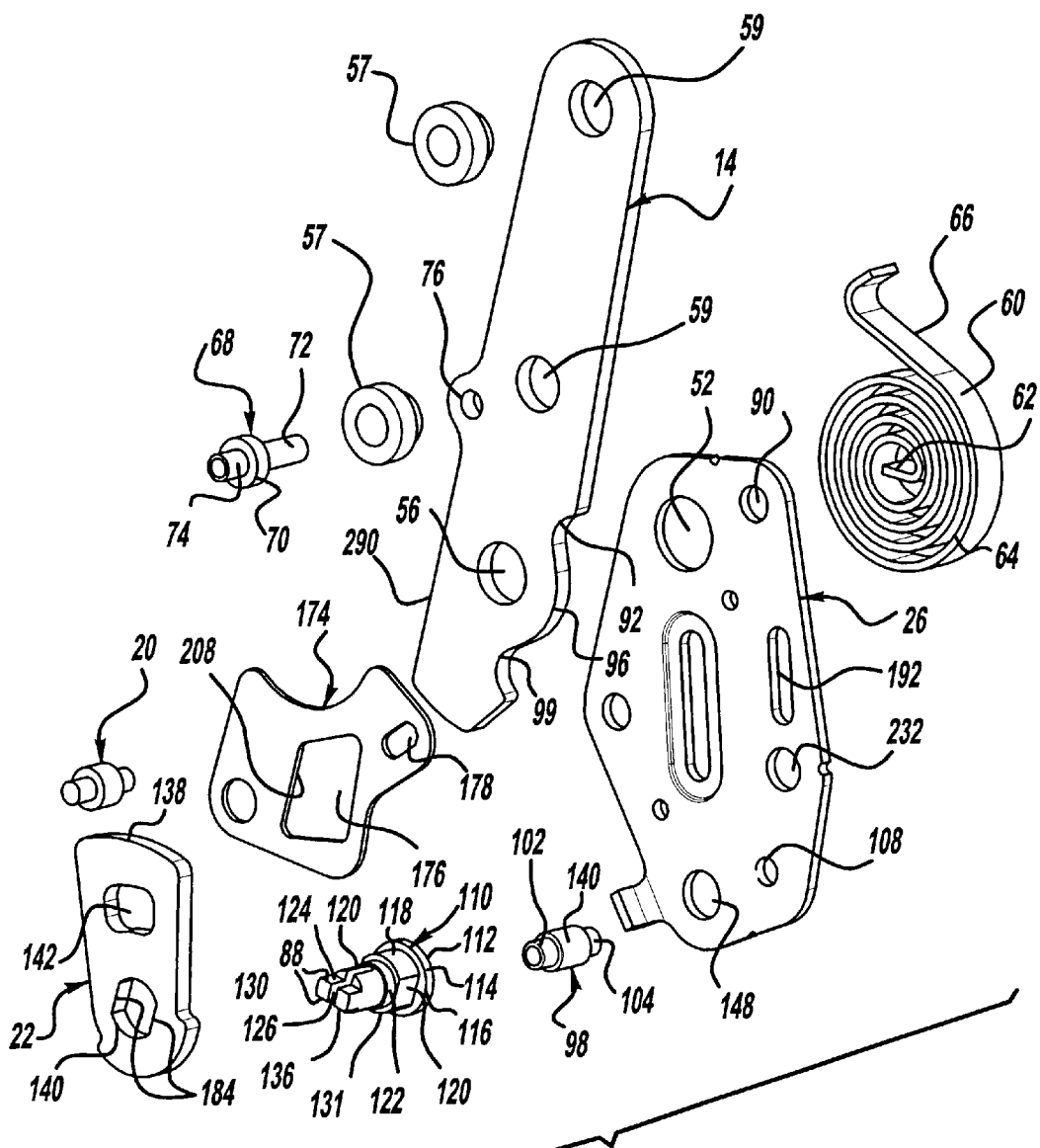
FIG. 1C is a detailed view of cam components of the seat hinge assembly.
Figure 1D:
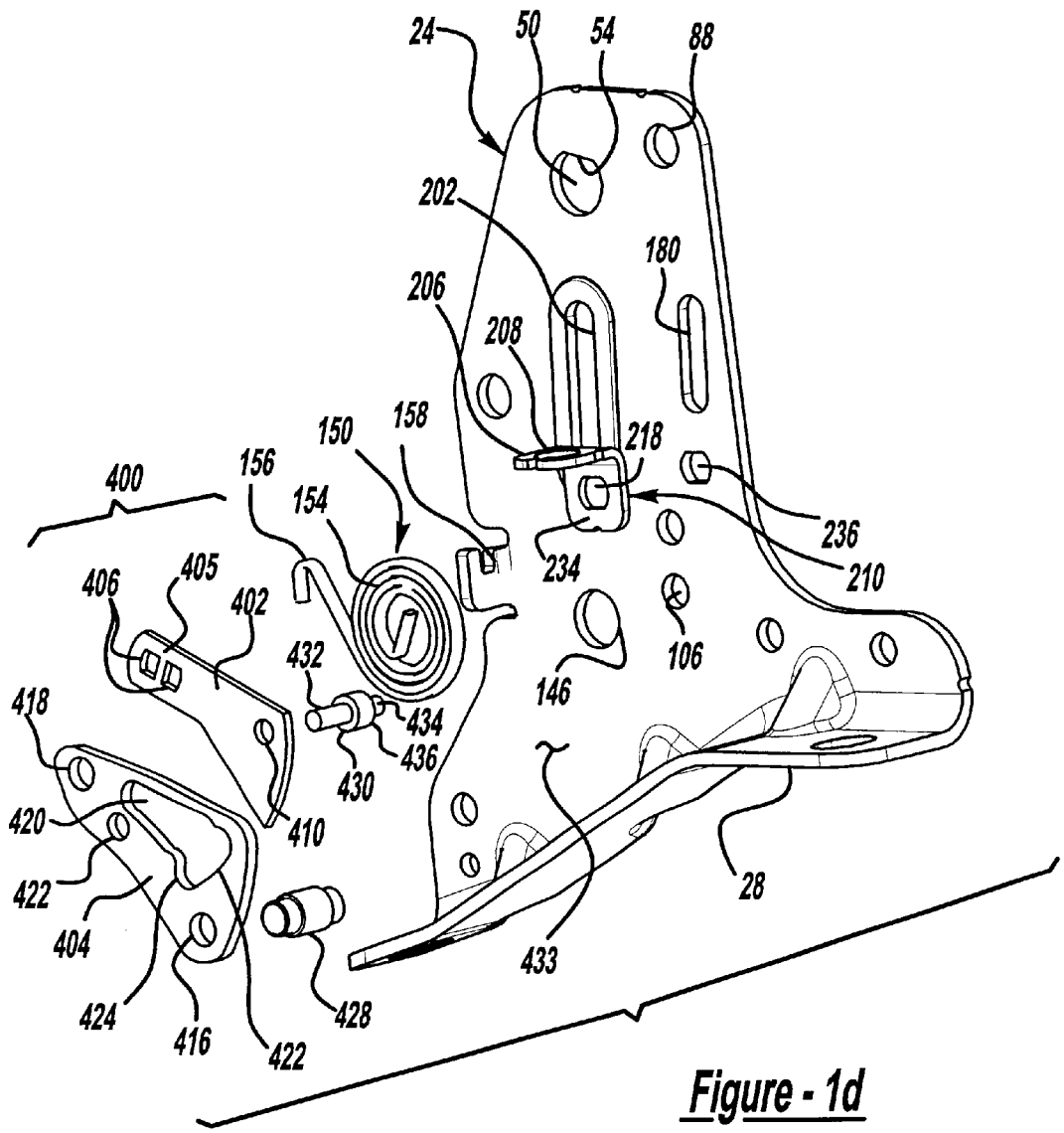
FIG. 1D is a detailed view of components of a latch release of the seat binge assembly.
Figure 2:
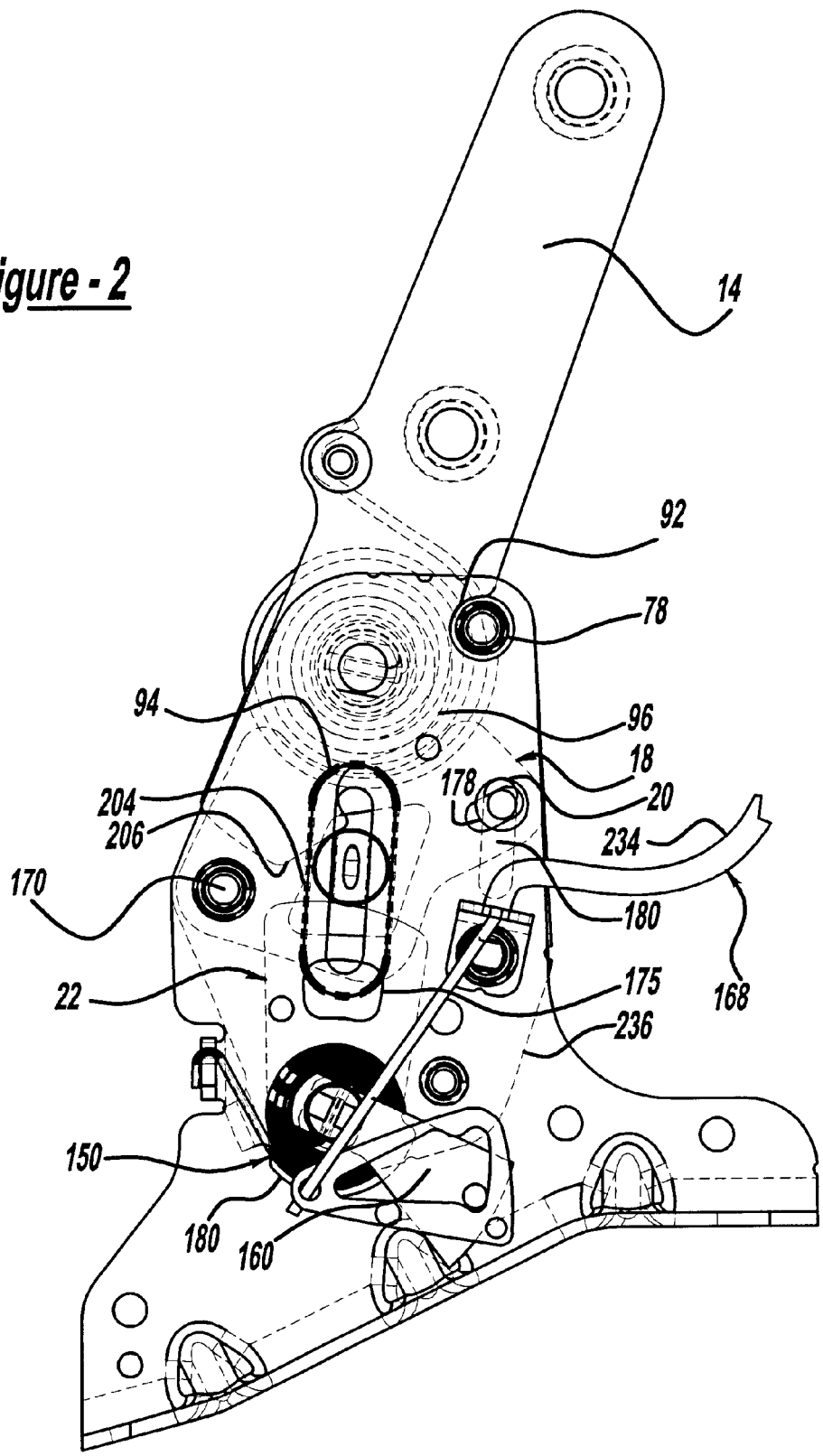
FIG. 2 is a side view of the seat hinge assembly in an upright position.
Figure 3:
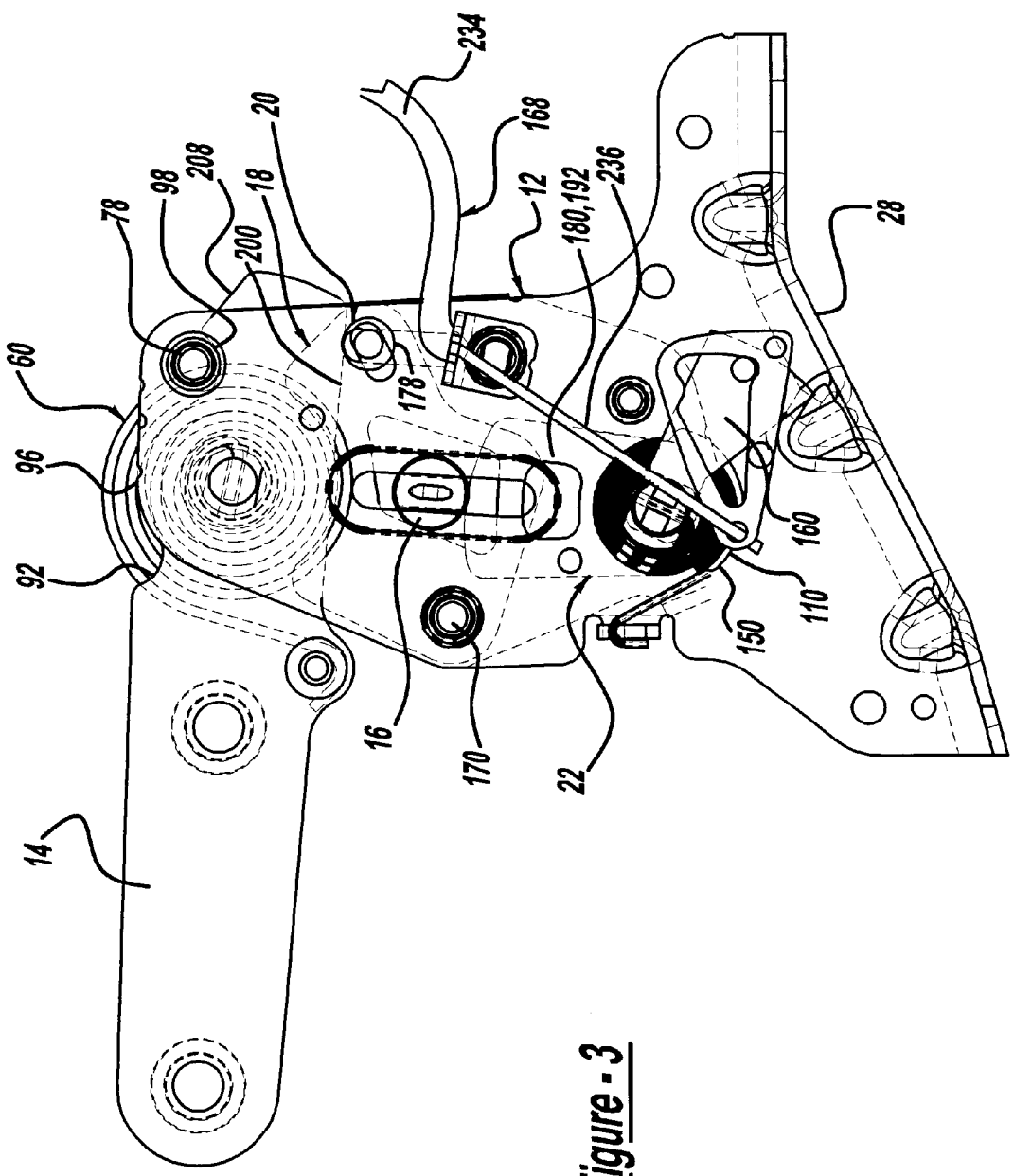
FIG. 3 is a side view of the seat hinge assembly in a fold-forward position.

With reference to FIGS. 1 through 3, a seat hinge assembly 10 is provided. The seat hinge assembly 10 includes a lower support member 12 that pivotally supports an arm 14. A locking arrangement is supported by the lower support member 12 and includes a lock pin 16, a lock-plate arrangement 18 and a dump-lock rivet 20 for locking the arm 14 in either an upright or a fold-forward position. The lock pin 16 and dump-lock rivet 20 are operatively connected to a cam 22 for selectively engaging the arm 14.

The lower support member 12 includes inner and outer plates 24,26. The inner plate 24 includes an expanded base portion having an attachment plate 28 extending perpendicularly therefrom. The attachment plate 28 enables the seat hinge assembly 10 to be rigidly attached to an external structure, as described in further detail below.

A main pivot 30 is supported between the inner and outer plates 24,26 for rotatably supporting the arm 14. The main pivot 30 includes a first cylindrical portion 32 having an axial groove 34 extending through its diameter. A second cylindrical portion 36 coaxially flanks the first cylindrical portion 32 and is generally of larger diameter than the first cylindrical portion 32. The second cylindrical portion 36 includes a circumferential bearing surface 38. Adjacent the second cylindrical portion 36 is a radially extending disk 40 having a third cylindrical portion 42 coaxially extending therefrom. The third cylindrical portion 42 includes a circumferential bearing surface 44. A fourth cylindrical portion 46 having a keyed face 48 coaxially flanks the third cylindrical portion 42.

The main pivot 30 is supported between the inner and outer plates 24,26 by apertures 50,52, respectively. The aperture 50 of the inner plate 24 includes a flat 54. The aperture 52 of the outer plate 26 receives the second cylindrical portion 36 therethrough and the aperture 50 of the inner plate 24 receives the fourth cylindrical portion 46 therethrough, whereby the keyed face 48 of the main pivot 30 aligns with the flat 54 of the inner plate 24. In this manner, the main pivot 30 is fixed from rotation relative the inner and outer plates 24,26. The third cylindrical portion 42 of the main pivot 30 is received through an aperture 56 of the arm 14, whereby the circumferential bearing surface 44 provides smooth rotation of the arm 14 about the main pivot 30. The third cylindrical portion 42, however, is not completely covered by the arm 14, having a portion of its length extending past the aperture 56. A spacer bushing 58 is included and is received onto the third cylindrical portion 42 to cover the remaining length of the third cylindrical portion 42. The spacer bushing 58 assists in aligning the arm 14 between the inner and outer plates 24,26 about the main pivot 30.

A pair of mounts 57 are attached to the arm 14 through apertures 59. The mounts 57 enable attachment of a seatback to the arm 14, as discussed below. The arm 14 is biased in an upright position by a coil spring 60. The coil spring 60 includes a centrally disposed plate 62 that extends to form a plurality of concentric coils 64 ending in a tangentially extending curved arm 66. The centrally disposed plate 62 is received into the groove 34 of the first cylindrical portion 32 for fixing the coil spring 60 to the main pivot 30. The curved arm 66 seats against an anchor post 68 extending from the arm 14. The anchor post 68 includes a centrally disposed cylindrical portion 70 having first and second cylindrical portions 72,74 extending coaxially therefrom. The curved arm 66 of the coil spring 60 seats against the first cylindrical portion 72 and the second cylindrical portion 74 is received into an aperture 76 of the arm 14 for fixedly attaching the anchor post 68 to the arm 14.

A stop pin 78 is included for defining a range of rotational motion of the arm 14 relative to the lower support member 12. The stop pin 78 includes a centrally disposed cylindrical portion 80 having first and second cylindrical portions 82,84 coaxially extending from either side. A nylon bushing 86 is received onto the central cylindrical portion 80. The first and second cylindrical portions 82,84 are received into respective apertures 88,90 of the inner and outer support plates 24,26. The arm 14 includes upper and lower seating shoulders 92,94 interconnected by an arcuate face 96. In an upright position, the stop pin 78 seats within the upper seating shoulder 94 to prohibit further rearward rotation of the arm 14 relative to the lower support member 12. In a fold-forward position, the stop pin 78 seats within the lower seating shoulder 94 to prohibit further forward rotation of the arm 14 relative to the lower support member 12. As the arm 12 is caused to rotate between the upright and fold-forward positions, the arcuate face 96 slidably engages the nylon bushing 86.

A lower spacer rivet 98 is also provided and includes a main cylindrical portion 100 having first and second cylindrical portions 102,104 extending from either side. The first and second cylindrical portions 102,104 are received into apertures 106,108 of the inner and outer plates 24,26, respectively. The lower spacer rivet 98 assists in defining a distance between the inner and outer plates 24,26.

The cam 22 is rotatably supported between the inner and outer plates 24,26 by a cam pivot 110. The cam pivot 110 includes a first cylindrical portion 112 having a circumferential bearing surface 114. A radially extending disk 116 is adjacent to the first cylindrical portion 112 and has a coaxially aligned second cylindrical portion 118 extending therefrom. The second cylindrical portion 118 includes key surfaces 120 formed in its circumference. Extending from the second cylindrical portion 118 are third and fourth cylindrical portions 122,124. The third cylindrical portion 122 is generally of a smaller diameter than the second cylindrical portion 118 and includes a circumferential bearing surface 134. The fourth cylindrical portion 124 is of a slightly smaller diameter than the third cylindrical portion 122 and includes a groove 126 extending across the diameter along its entire length and key surfaces 128 formed in an end portion. The key surfaces 128 and the groove 126 produce axially extending fingers 130,132 projecting from the fourth cylindrical portion 124.

The cam 22 includes a cam surface 138 and first and second apertures 140,142 extending therethrough. The cam pivot 110 is received through the first aperture 140 of the cam 22, which includes flats 144 for alignment with the key surfaces 120 of the second cylindrical portion. In this manner, the cam 22 is fixed for rotation with the cam pivot 110. The cam pivot 110 is received in and supported by apertures 146,148 of the inner and outer plates 24,26, respectively. The apertures 146,148 of the inner and outer plates 24,26 receive the first and third cylindrical portions 112,122, respectively, whereby the circumferential bearing surfaces 114,134 enable smooth rotation of the cam pivot 110 within the apertures 146,148.

The cam pivot 110 is biased in a first rotational direction by a coil spring 150. The coil spring 150 includes a centrally disposed plate 152 that extends to form a plurality of concentric coils 154 ending in a tangentially extending curved arm 156. The centrally disposed plate 152 is received into the groove 126 of the fourth cylindrical portion 124 for fixing the coil spring 150 to the cam pivot 110. The curved arm 156 seats against a bracket 158 perpendicularly extending from the inner plate 24.

Figure 5:
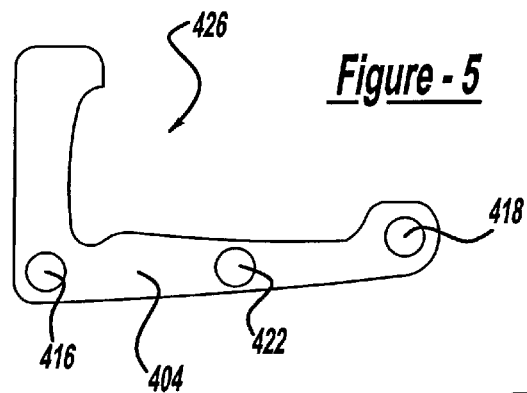
FIG. 5 is a plan view of an alternative cam plate according to the principles of the present invention.

A latch release mechanism 400 is operably attached to the cam pivot 110 for actuating the cam 22 and includes a latch plate 402 and a cam plate 404. The latch plate 402 includes apertures 406 disposed at a first end, separated by a cross member 408, an aperture 410 disposed at a second end and a recess 412 having an edge 414. The latch plate 402 is mounted onto the cam pivot 110, whereby the cross member 408 is received into the groove 126 of the fourth cylindrical portion 124 and the fingers 130,132 of the fourth cylindrical body 124 extend through the apertures 406. The cam plate 404 includes a first aperture 416, a second aperture 418, a central aperture 420 and a dimple 422. The central aperture 420 includes a seat recess 422 interconnected with a cam edge 424. Alternatively, as shown in FIG. 5, the cam plate 404 may include a central recess 426, thereby generally providing a J-shape to the cam plate 404, with the seat recess 422 and cam edge 424 open.

The cam plate 404 is pivotally supported by the inner plate 24, whereby a pivot pin 428 is disposed through the first aperture 416. The latch plate 402 and cam plate 404 are positioned generally parallel to one another and are generally in sliding engagement with one another. Further, it should be noted that the end of the cam plate 404 having the second aperture 418 therethrough preferably angles upward relative to the latch plate 402, thereby avoiding interference contact between the exposed fingers 130,132 and the cam plate 404. As will be described in further detail below, the second aperture 418 of the cam plate 404 is connected with a cable arrangement 168 for remotely actuating the cam 22.

A link pin 430 is also included and is disposed through the aperture 410 of the latch plate 402. A first cylindrical end 432 of the link pin 430 extends into the central aperture 420 of the cam plate 404 and is in selective sliding engagement with the seat recess 422 and the cam edge 424. A second cylindrical end 434 of the link pin 430 includes a domed end 436 that is slidably engaged with a face 438 of the inner plate 24. Also, the dimple 422 of the cam plate 404 extends into the recess 412 of the latch plate 402 and is selectively in sliding engagement with the edge 414. The seat recess 422 prohibits accidental release of the seat hinge assembly 10, whereby the first cylindrical end 432 of the link pin 430 is caught in the seat recess 422 should the latch plate 402 rotate due to inadvertent rotation of the cam pivot 110.

It will be appreciated that the hereindescribed latch release mechanism 400 may be implemented with any one of a number of various latch or hinge assemblies. In short, the hereindescribed seat hinge assembly 10 merely provides an exemplary environment for implementation of the latch release mechanism 400 of the present invention. Thus, those skilled in the art will readily realize that the latch release mechanism 400 of the present invention may be used with any device requiring pivot actuation of a rotatable member.

The lock-plate arrangement 18 is pivotally supported between the inner and outer plates 24,26 about a lock-plate pivot 170. The lock-plate arrangement 18 includes first and second lock-plates 172,174, each having a centrally disposed aperture 176 therethrough. Each lock-plate 172,174 further includes a slot 178 disposed through an end opposite the lock-plate pivot end. Both the lock-plate arrangement 18 and the inner and outer plates 24,26 slidably support the dump-lock rivet 20. The dump-lock rivet 20 includes a main cylindrical portion 182 having first and second cylindrical portions 184,186 extending coaxially from either side. The main cylindrical portion 182 includes a circumferential face 188. The first and second cylindrical portions 184,186 are initially received through the slots 178 of the lock-plate arrangement 18 and subsequently through slots 190,192 in the inner and outer plates 24,26, respectively. In this manner, the dump-lock rivet 20 is slidable along the slots 178 of the locking arrangement 18 subject to boundaries imposed by the slots 190,192 of the inner and outer plates 24,26, and likewise, the dump-lock rivet 20 is slidable along the slots 190,192 of the inner and outer plates 24,26, subject to boundaries imposed by the slots 178 of the lock-plate arrangement 18.

The lock pin 16 is slidably supported between the inner and outer plates 24,26 and is received through the centrally disposed apertures 176 of the lock plates 172,174. The lock pin 16 includes a main cylindrical portion 184 having a circumferential bearing surface 196 and substantially rectangular shaped portions 198,200 extending from either side. The rectangular portions 198,200 are received into slots 202,204 of the inner and outer plates 24,26, whereby the lock pin 16 is slidable along the length of the slots 202,204. The cam surface 138 of the cam 22 slidably engages the circumferential bearing surface 196 of the lock pin 16 for selectively biasing the lock pin 16 along the slots 202,204. Further, the circumferential bearing surface 196 of the lock pin 16 slidably engages an inside edge 206 of the apertures 176 of the lock-plate arrangement 18 and selectively engages an edge 208 of the arm 14 for locking the arm 14 in the upright position.

A cable mount 210 is also provided and is supported on the inner plate 24 by a cable mount rivet 212. The cable mount 210 is generally L-shaped, having first and second arms 214,216, and includes a keyed aperture 218 through the first arm 214 and a cable aperture 220 through the second arm 216. The cable mount rivet 212 includes a central cylindrical portion 222 having first and second cylindrical portions 224,226 extending therefrom. The first cylindrical body 224 includes keyed surfaces 228 along its length. The first and second cylindrical bodies 224,226 are received through apertures 230,232 of the inner and outer plates 24,26. The aperture 230 is a keyed aperture, whereby the keyed surfaces 228 of the first cylindrical portion 224 align for prohibiting the cable mount rivet 212 from rotating. The first cylindrical portion 224 extends through the aperture 230 for supporting the cable mount 210. Specifically, the first cylindrical portion 224 is received through the keyed aperture 218 of the cable mount 212, fixing the cable mount 212 from rotation.

The cable arrangement 168 includes a cable housing 234 and a cable 236 slidably disposed within the cable housing 234. An end of the cable housing 234 is retained by the cable mount 210 through the cable aperture 220 of the second arm 216. The cable 236 extends downward therefrom and is connected to the cam plate, at the second aperture, for selectively actuating the latch release mechanism 400 against the biasing force of the coil spring 150. In this manner, the cable arrangement 168 enables remote activation of the seat hinge assembly 10.

Figure 6A:
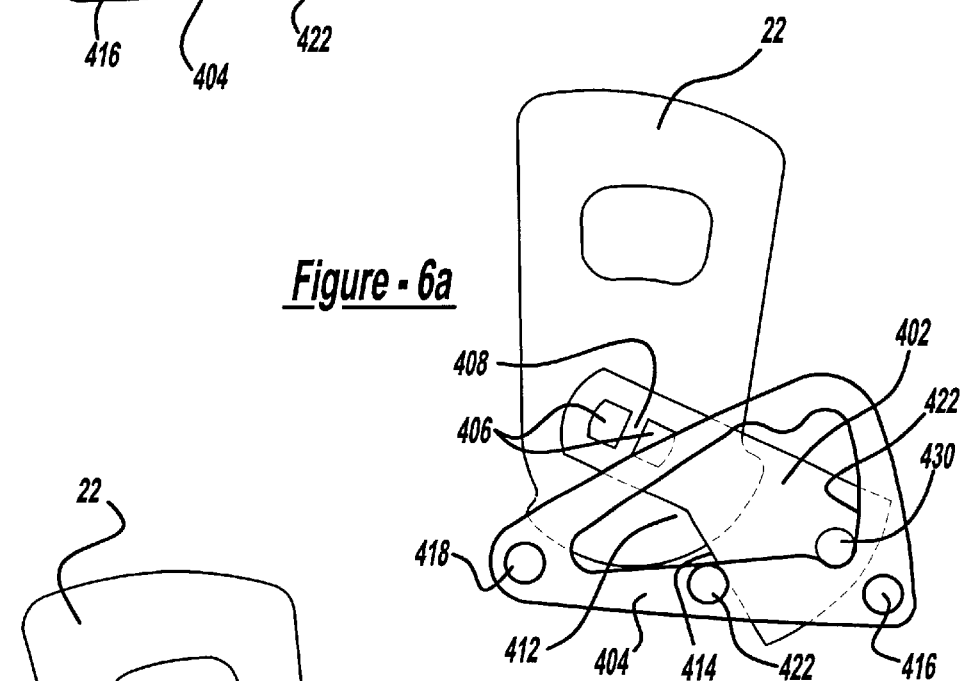
FIGS. 6A–6C detail activation of a latch release mechanism according to the principles of the present invention.
Figure 6B:
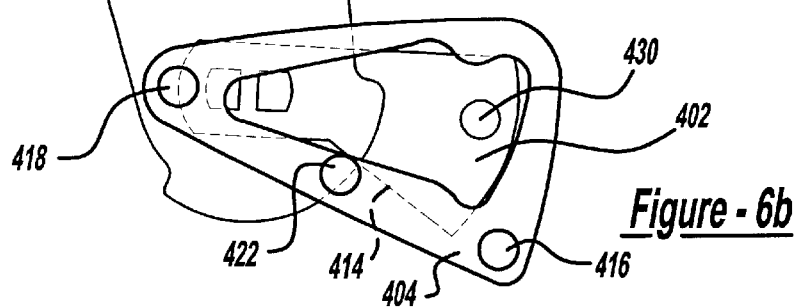
Figure 6C:
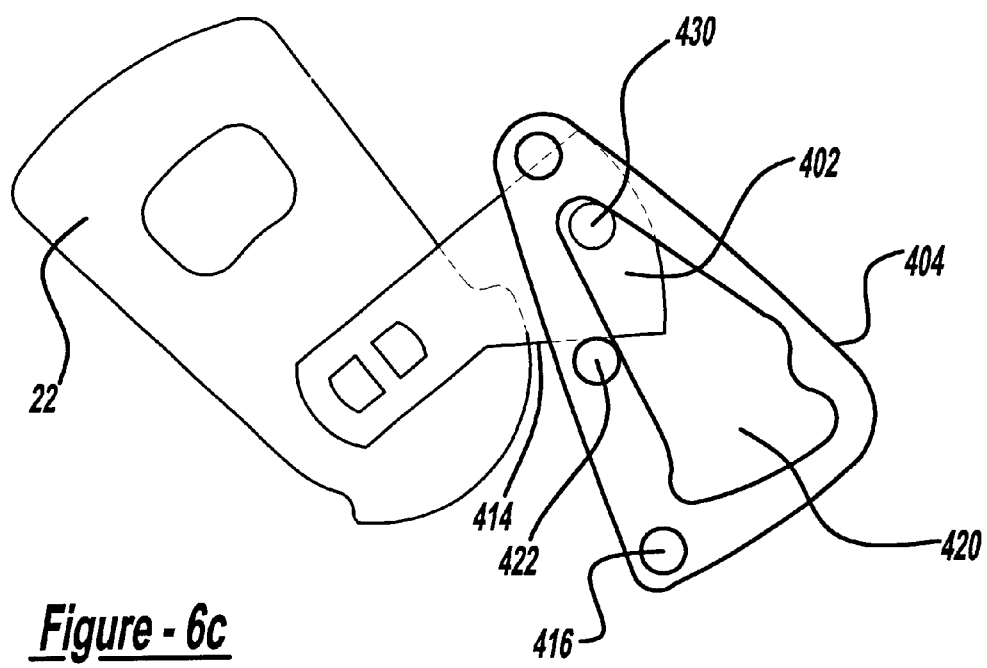

With particular reference to FIGS. 6A through 6C, actuation of the latch release mechanism 400 will be described in detail. Initially, the latch release mechanism 400 is in a rest position, whereby the dimple 422 is out of sliding engagement with the edge 414, the link pin 430 is disposed within the seat recess 422 and the cam 22 is in biased engagement with the lock pin 16. As the cable arrangement 168 is actuated, the cable 236 pulls the cam plate 404, thereby pivoting the cam plate 404 about the pivot pin 428. As the cam plate 404 is caused to pivot, the link pin 430 slidably travels up out of the seat recess 422 and along the cam edge 424. The interface between the cam edge 424 and the link pin 430 causes the latch plate 402 to pivot upward, thereby rotating the cam pivot 110 for relieving the cam 22 from biased engagement with the lock pin 16. Further, the geometric layout of the cam edge 424 and the link pin 430, provides a first torque for rotating the cam pivot 110. As the link pin 430 slides along the cam edge 424 a mechanical advantage is provided, whereby a minimal pulling force (i.e. the first torque) is required to pivot the cam plate 404 and thus the latch plate 402. Thus, an operator is able to initially relieve biased engagement of the cam 22 and the lock pin 16 with reduced effort against the biasing force of the coil spring 150. In this manner, the mechanical advantage provided by the latch release mechanism 400 enables an operator to easily actuate the seat hinge assembly 10 even in a situation where the internal components become bound.

Eventually, the link pin 430 slides along the cam edge 424 to a point at which the dimple 422 engages the edge 414 of the latch plate 402. A transition occurs, whereby the link pin 430 is disengaged from the cam edge 424 and the dimple 422 slidably engages the edge 414 of the latch plate 402 for continuing rotation of the latch plate 402 and the cam pivot 110 at a second torque. The transition also increases the pulling force required by the cable 236 to continue rotation of the cam pivot 110. The dimple 422 slides along the edge 414 until the cam 24 is sufficiently relieved from biased engagement with the lock pin 16, whereby operation of the seat hinge assembly 10 may ensue, as described below.

In the upright position, the arm 14 is prohibited from forward rotation by the lock pin 16, which is biased into engagement with the edge 208 by the cam 22. Also, the arm 14 is prohibited from rearward rotation by the stop pin 78 seated within the upper seating shoulder 92. To enable forward rotation of the arm 14, the cam 22 is rotated in a counterclockwise direction, relative to the views shown in FIGS. 2 and 3. Rotation of the cam 22 enables the lock pin 16 to slide downward between the slots 202,204, thereby disengaging from the edge 208 of the arm 14 and relieving biasing force against the inside edge 206 of the aperture 176. In this manner, the lock-plate arrangement 18 rotates clockwise about the lock-plate pivot 170 as gravity acts to pull the lock-plate arrangement 18 downward. As a result, the dump-lock rivet 20 travels downward along the slots 190,192 of the inner and outer plates 24,26 and the slots 178 of the lock-plate arrangement 18. With the lock pin 16 disengaged from the edge 208 of the arm 14, the arm 14 is free to rotate forward, against the biasing force of the coil spring 60.

As the arm 14 rotates forward, the arcuate face 96 of the arm 14 slides along the bearing surface 86 of the stop pin 78 until the stop pin 78 seats within the lower seating shoulder 94, thereby prohibiting further forward rotation of the arm 14. The biasing force of the coil spring 150 urges the cam 22 in a clockwise direction, whereby the cam surface 138 acts upon the lock pin 16 causing the lock pin 16 to slide upward along the slots 202,204. As the lock pin 16 slides upward within the slots 202,204, it engages the inside edge 206 of the aperture 176 of the lock-plate arrangement 18. In this manner, the lock-plate arrangement 18 is caused to rotate counter-clockwise about the lock-plate pivot 170. As a result, the dump-lock rivet 20 slides upward along the slots 190,192 until the circumferential surface 188 of the main cylindrical body 182 contacts a front edge 240 of the arm 14, thereby prohibiting rearward rotation of the arm 14. In the fold forward position, a downward load may be applied to the arm 14 without effecting the components of the locking arrangement. The stop pin 78 prohibits any further forward rotation of the arm14 that would otherwise result from the load, thereby ensuring the internal components of the seat hinge assembly 10 remain static. Further, the lock pin 16 is prohibited form upward travel within the slots 202, 204 by engagement with the inside edge 206 of the aperture 176. This avoids any binding of the internal components that could otherwise occur.

To enable rearward rotation of the arm 14, the latch release mechanism 400 is again actuated to rotate the cam 22 in a clockwise direction, thereby enabling the lock pin 16 to slide downward along the slots 202,204. The lock-plate arrangement pivots clockwise and the dump-lock rivet 20 falls out of engagement with the front edge 240 of the arm 14. The arm 14 is then caused to rotate rearward by the biasing force of the coil spring 60, until the arm 14 again achieves an upright position.

Figure 4:
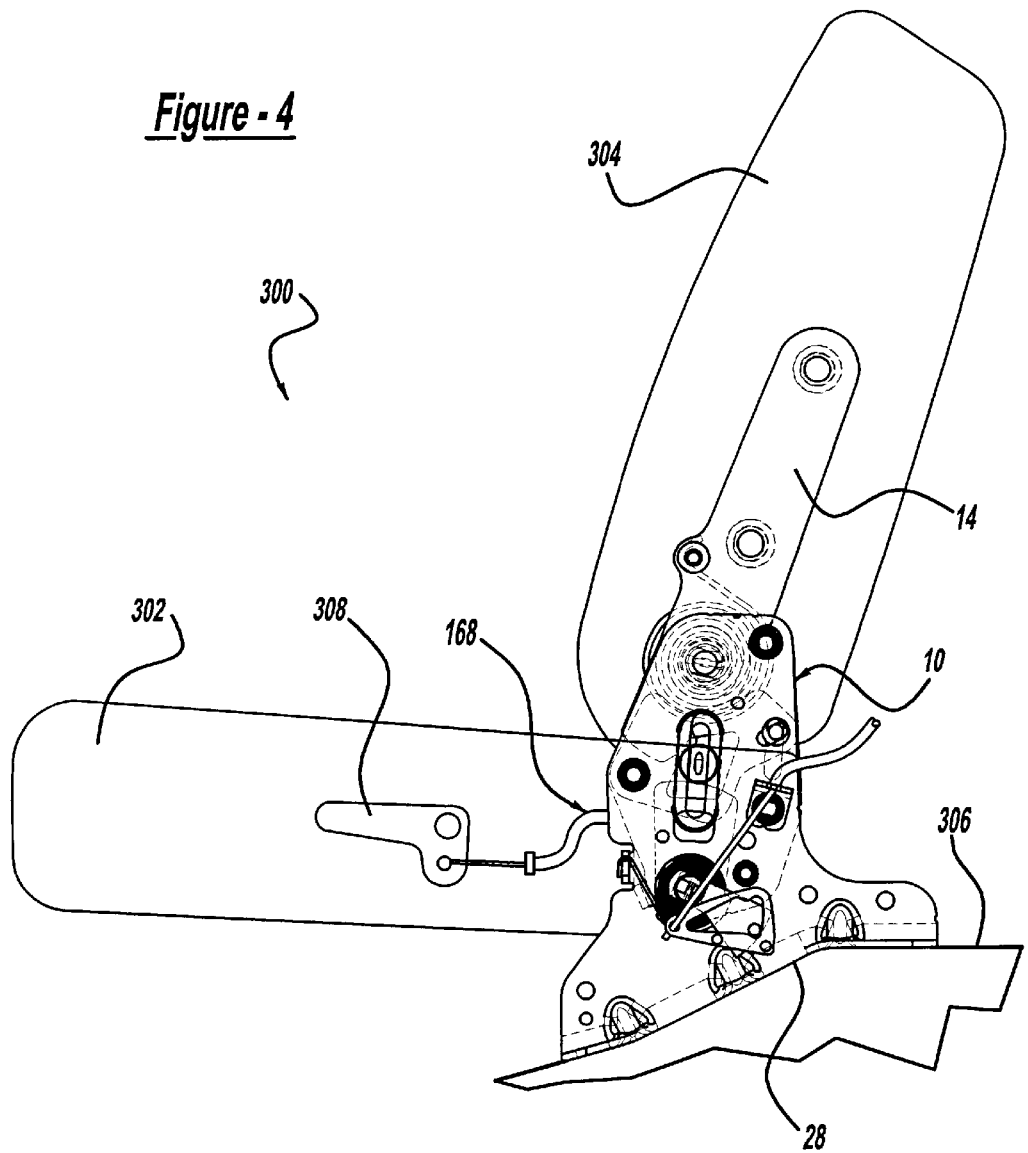
FIG. 4 is a schematic view of a seat assembly implementing the seat hinge assembly of the present invention.

With particular reference to FIG. 4, a seat assembly 300 is shown. The seat assembly 300 includes a seat 302, a seatback 304 and incorporates the seat hinge assembly 10 having the latch release mechanism 400 of the present invention. The seatback 304 is mounted to and supported by the arm 14. The seat hinge assembly 10 is fixedly attached to an external support structure 306, such as a vehicle floor, by the attachment plate 28. A remote handle 308 is also included and is connected to the cable arrangement 168 for remotely actuating the latch release mechanism 400. Actuation of the latch release mechanism 400 enables the seat 304 to be selectively positioned in either an upright position or a forward dump position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A release mechanism for use in conjunction with a seat hinge assembly, the release mechanism comprising:
   a latch plate fixed for rotation with a pivot and rotatable between a first position and a second position;
   a first pin extending from said latch plate;
   a cam plate pivotally supported about an axis and including a cam edge in selective sliding contact with said first pin;
   a second pin extending from said cam plate and in selective sliding contact with an edge of said latch plate;
   wherein said cam plate is rotatable through a first range in which said first pin slidably engages said cam edge to provide a first torque for rotating said latch plate from said first position; and
   wherein said cam plate transitions from said first range to a second range on which said first pin disengages said cam edge and said second pin slidably engages said edge of said latch plate to provide a second torque for rotating said latch plate to said second position.

2. The release mechanism of claim 1, wherein said cam plate further includes a seat recess to retain said first pin when said latch plate is in said first position, whereby rotation of said latch plate, absent concurrent rotation of said cam plate, is prohibited.

3. The release mechanism of claim 1, wherein engagement of said first pin and said cam edge through said first range provides a greater mechanical advantage than provided in said second range.

4. The release mechanism of claim 1, wherein said cam edge is an edge of a central aperture disposed through said cam plate.

5. The release mechanism of claim 1, wherein said cam edge is an edge of a formed recess of said cam plate.

6. The release mechanism of claim 1, wherein said cam plate is selectively actuated by a remote cable assembly.

7. A seat hinge assembly, comprising:
   a support;
   an arm pivotally supported by said support;
   a locking arrangement supported by said support for selectively locking said arm in first and second positions;
   a member operable between first and second positions of rotation for selectively actuating said locking arrangement; and
   a latch release mechanism comprising:
      a latch plate fixed for rotation with said member;
      a first pin extending from said latch plate;
      a cam plate pivotally supported by the support plate and including a cam edge in selective sliding contact with said first pin;
      a second pin extending from said cam plate and in selective sliding contact with an edge of said latch plate;

wherein said cam plate is rotatable through a first range in which said first pin slidably engages said cam edge to provide a first torque for rotating said latch plate and said member from said first position; and wherein said cam plate transitions from said first range to a second range on which said first pin disengages said cam edge and said second pin slidably engages said edge of said latch plate to provide a second torque for rotating said latch plate and said member to said second position.

8. The seat hinge assembly of claim 7, wherein said cam plate further includes a seat recess to retain said first pin when the member is in said first position, whereby rotation of the member, absent concurrent rotation of said cam plate, is prohibited.

9. The seat hinge assembly of claim 7, wherein engagement of said first pin and said cam edge through said first range provides a greater mechanical advantage than provided in said second range, thereby easing initial rotation of the member.

10. The seat hinge assembly of claim 7, wherein said cam edge is an edge of a central aperture disposed through said cam plate.

11. The seat hinge assembly of claim 7, wherein said cam edge is an edge of a formed recess of said cam plate.

12. The release mechanism of claim 7, wherein said cam plate is selectively actuated by a remote cable assembly.

13. A release mechanism for use in conjunction with seat hinge assembly, the release mechanism comprising:

a latch plate fixed for rotation with a pivot and rotatable between a first position and a second position;

a first pin extending from said latch plate;

a cam plate pivotally supported by about an axis and including a cam edge in selective sliding contact with said first pin;

a second pin extending from said cam plate and in selective sliding contact with an edge of said latch plate; and wherein said cam plate further includes a seat recess for retaining said first pin when said latch plate is in said first position, whereby rotation of the member, absent concurrent rotation of said cam plate, is prohibited.

14. The release mechanism of claim 13, wherein said cam plate and said latch plate are interconnected and rotation of said cam plate through an actuation range causes said latch plate to provide a varying torque output.

15. The seat hinge assembly of claim 13, wherein engagement of said first pin and said cam edge through said first range provides a greater mechanical advantage than provided in said second range.

16. The seat hinge assembly of claim 13, wherein said cam edge is an edge of a central aperture disposed through said cam plate.

17. The seat hinge assembly of claim 13, wherein said cam edge is an edge of a formed recess of said cam plate.

18. The release mechanism of claim 13, wherein said cam plate is selectively actuated by a remote cable assembly.

* * * * *